(12) United States Patent
Desjardins

(10) Patent No.: US 11,084,542 B2
(45) Date of Patent: Aug. 10, 2021

(54) AERODYNAMIC SKIRT DEVICE FOR TRAILER

(71) Applicant: JIADEBAO INC., San Pedro, CA (US)

(72) Inventor: Philippe Desjardins, St-Faustin-Lac-Carre (CA)

(73) Assignee: JDB AERO COMPOSITES INC., Mont-Tremblant (CA)

( * ) Notice: Subject to any disclaimer, the term of this patent is extended or adjusted under 35 U.S.C. 154(b) by 0 days.

(21) Appl. No.: 15/905,270

(22) Filed: Feb. 26, 2018

(65) Prior Publication Data
US 2018/0244228 A1 Aug. 30, 2018

Related U.S. Application Data

(60) Provisional application No. 62/463,398, filed on Feb. 24, 2017.

(51) Int. Cl.
*B62D 35/00* (2006.01)
*B60R 19/56* (2006.01)
*F16M 13/02* (2006.01)

(52) U.S. Cl.
CPC .......... *B62D 35/008* (2013.01); *B60R 19/565* (2013.01); *B62D 35/001* (2013.01); *F16M 13/02* (2013.01)

(58) Field of Classification Search
CPC .. B62D 35/001; B62D 35/008; B62D 25/168; B62D 25/188; B60R 19/565; B60R 19/42
USPC .......................................... 296/180.1, 180.4
See application file for complete search history.

(56) References Cited

U.S. PATENT DOCUMENTS

| | | | | |
|---|---|---|---|---|
| 9,975,583 | B2 * | 5/2018 | Senatro | B62D 35/001 |
| 2011/0233960 | A1 * | 9/2011 | Heinz | B62D 35/001 |
| | | | | 296/180.4 |
| 2014/0072364 | A1 * | 3/2014 | Mancina | B62D 35/001 |
| | | | | 403/188 |
| 2017/0066487 | A1 * | 3/2017 | Boivin | B62D 35/001 |
| 2018/0319442 | A1 * | 11/2018 | Macherel | B62D 35/001 |

\* cited by examiner

*Primary Examiner* — Dennis H Pedder
(74) *Attorney, Agent, or Firm* — Brouillette Legal Inc.; Robert Brouillette

(57) ABSTRACT

The present invention is related to an aerodynamic side skirt assembly for attaching a panel to a trailer or semi-trailer. The present invention comprise a coupler configured to be attached to a frame rail of the trailer and to a panel, a compressible element preferably with a curved shape used as a damper and a bracket with a preferably flat surface connected to the panel and a rib through the length of the bracket.

21 Claims, 12 Drawing Sheets

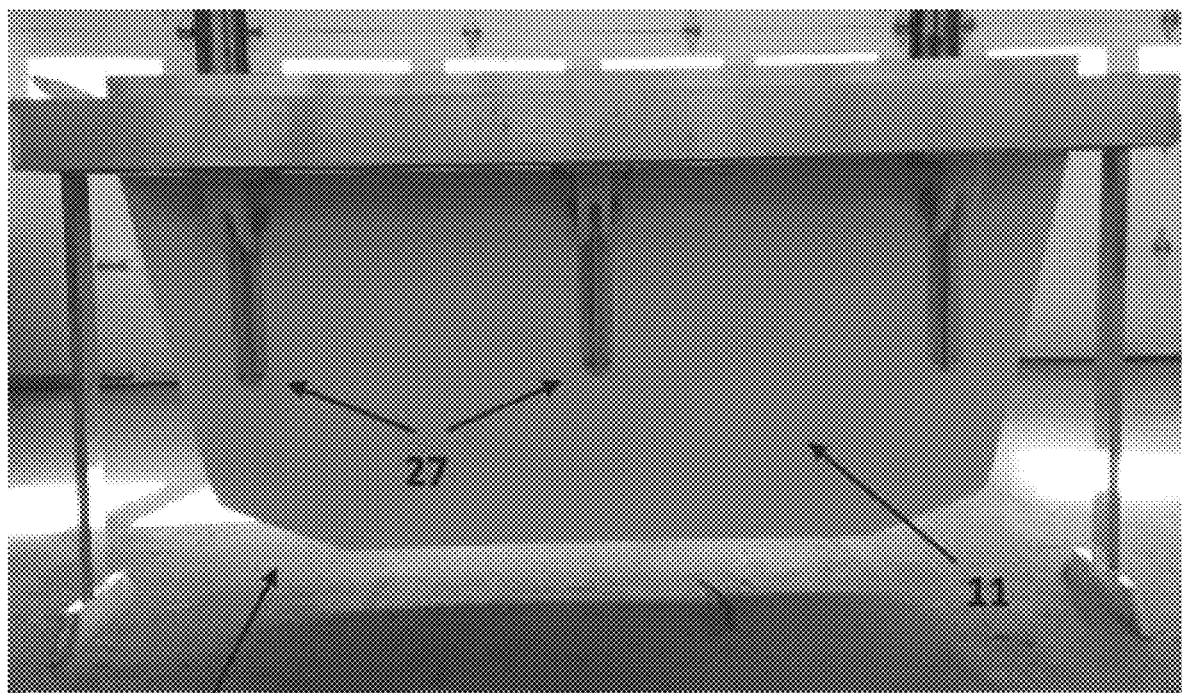
Fig. 4
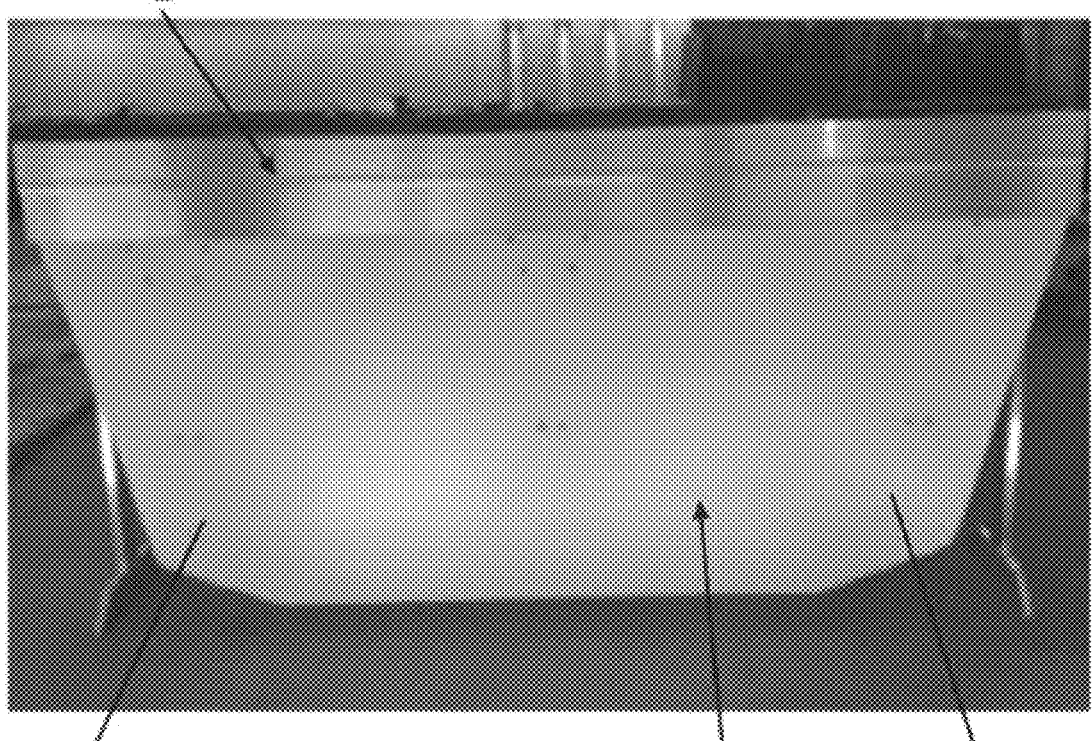
21 (17)　　　　Fig. 5　　　　17 (21)
11

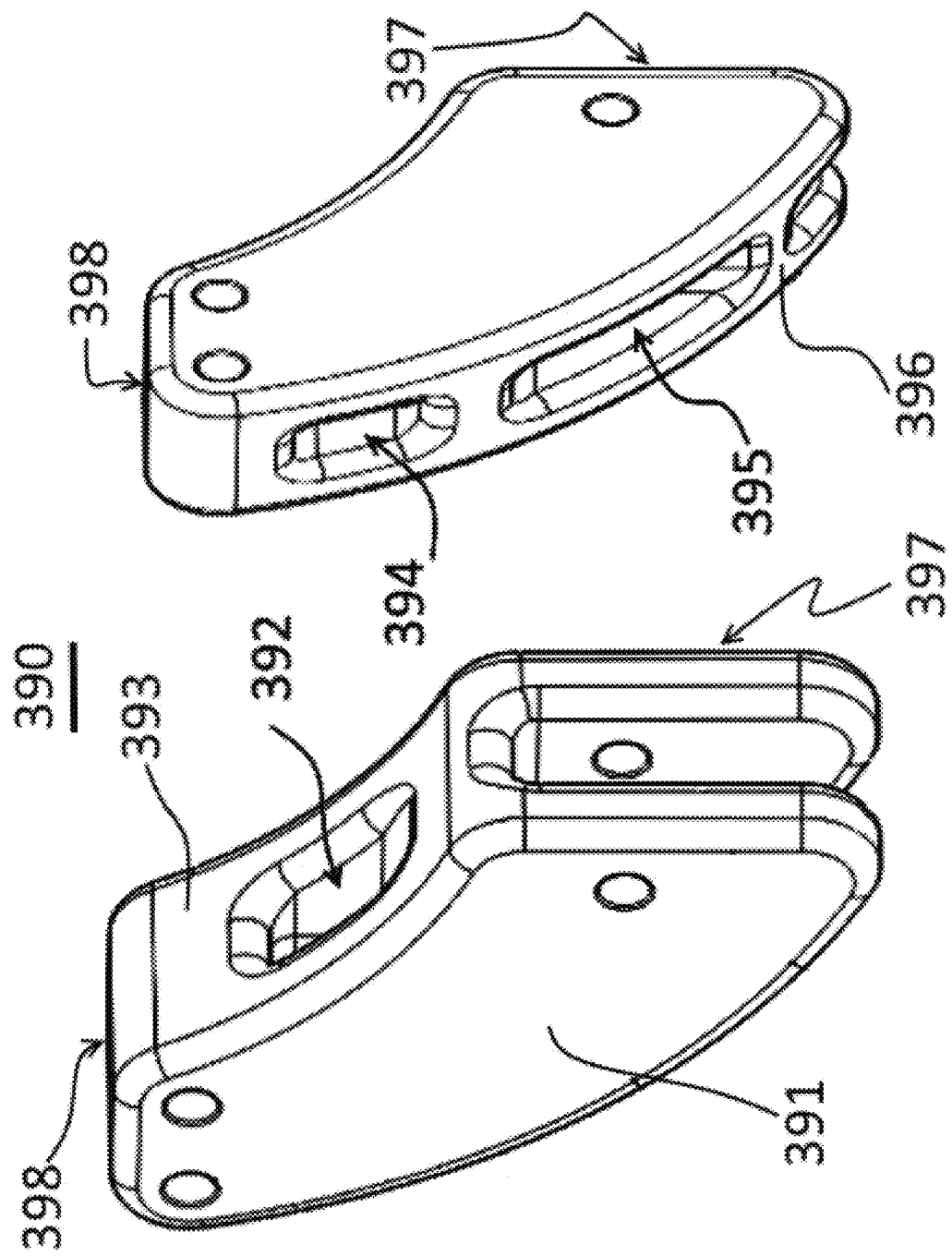

AERODYNAMIC SKIRT DEVICE FOR TRAILER

CROSS-REFERENCE TO RELATED APPLICATIONS

The present patent application claims the benefits of priority of U.S. Patent Application No. 62/463,398, entitled "Aerodynamic Skirt Device for Trailer", and filed at the United States Patent Office on Feb. 24, 2017.

FIELD OF THE INVENTION

The present invention relates generally to trailers or semi-trailers, such as truck-type trailers, for example. In particular, the present invention relates to both an aerodynamic side skirt system for reducing drag on such a trailer as well as a side underride skirt attachment system for attaching the side skirt to the trailer.

BACKGROUND OF THE INVENTION

Side skirts have been used to reduce wind flow resistance and drag on a trailer, truck, semitrailer, or other vehicle. The side skirt extends downwardly from the bottom edge of the trailer and/or chassis toward the roadway to partially enclose the floor assembly and undercarriage.

Air flow passing under a ground vehicle imparts a drag force to the vehicle when it impinges on and flows around the vehicle undercarriage components attached to or a part of the underside of a vehicle. Side skirt systems are designed to prevent or control the flow of air from entering the undercarriage region from the side of the ground vehicle, such as a trailer of a tractor-trailer truck system, for example. Such reduction on the drag of the ground vehicle may operate to conserve fossil fuels as well as other sources of vehicle drive power for hybrid vehicles, battery-operated vehicles, and alternative fuel-based vehicles, for example.

SUMMARY OF THE INVENTION

The shortcomings of the prior art are generally mitigated by a side skirt assembly for attachment to a trailer or semi trailer.

In one aspect, there is provided an aerodynamic side skirt assembly for attachment to a trailer or semi trailer, particularly to a trailer frame comprising lateral rails extending between the longitudinal sides of the trailer. The side skirt assembly comprising:

an elongated skirt panel having an inner surface and an outer surface; and one or more skirt attachment system configured to mount the skirt panel to a corresponding one or more frame rails, each skirt attachment system comprising:

a coupler configured to be coupled to the frame rail;

a bracket configured to be coupled to the inner surface of the skirt panel; and a compressive element configured to connect in a compressible manner the bracket to the coupler, the compressing element being made at least in part of a compressible material.

In another aspect, there is provided an apparatus for attaching an aerodynamic side skirt panel to a truck trailer, the apparatus comprising a coupler configured to be attached to a lateral rail of the truck trailer and to be connected to an upper portion of the skirt panel; a bracket configured to be connected to a lower portion of the skirt panel; and a compressible element linking the coupler the bracket.

The bracket may be longitudinally T-shaped, having a flange and a web portion, the flange portion of the bracket being configured to be coupled to an inner surface of the skirt panel and the web portion of the bracket being configured to mate with a distal extremity of the compressible element.

The coupler may be L-shaped, having a longer and a shorter portion, the longer portion of the coupler being configured to the lateral rail of the truck trailer and the shorter portion of the coupler being configured to be coupled to an inner surface of the skirt panel.

The lateral rail of the truck trailer may be longitudinally I-shaped, having 2 flange portions and a web portion, and the coupler may further comprise at least one pair of clamps configured to attach the longer portion of the coupler to one of the flange portions of the lateral rail. The coupler may further comprise a pair of tabs extending from the longer portion of the coupler and being configured being attached to an outer surface of the compressible element. The coupler may be configured to be removeably attached to the lateral rail of the truck trailer and to be fixedly connected to the upper portion of the skirt panel.

The compressible element may have a curved inner radial surface, a curved outer radial surface, two substantially parallel side surfaces, a first extremity surface configured to mate with the coupler and a second extremity surface configured to mate with the bracket. The first extremity surface may comprise at least one hole dimensioned and positioned to be alignable with at least one hole in a pair of tabs extending from the coupler. The second extremity surface comprises at least one hole dimensioned and positioned to be alignable with at least one hole in the bracket. The first or second extremity surface may comprise at least one aperture. The second extremity surface may comprise a U-shaped aperture dimensioned and positioned to mate with a web portion of the bracket.

The compressible element may be triangular-shaped.

In another aspect, there is provided an aerodynamic side skirt assembly for attachment to a trailer comprising lateral rails extending between the longitudinal sides of the trailer, the side skirt assembly comprising an elongated skirt panel having an inner surface and an outer surface; and at least one skirt attachment system configured to mount the skirt panel to a corresponding one or more frame rails, each skirt attachment system comprising: a coupler configured to be coupled to the frame rail; a bracket configured to be coupled to the inner surface of the skirt panel; and a compressive element configured to connect in a compressible manner the bracket to the coupler, the compressing element being made at least in part of a compressible material.

The skirt panel may have a substantially similar leading edge and trailing edge profile.

In another aspect, there is provided a method for attaching an aerodynamic side skirt panel to a trailer comprising at least one lateral rail extending between the longitudinal sides of the trailer, the method comprising: attaching a coupler to the at least one lateral rail of the truck trailer; attaching an upper portion of the skirt panel to the coupler; attaching a bracket to a lower portion of the skirt panel; and linking the coupler and the bracket.

The step of linking the coupler and the bracket may be accomplished by connecting one extremity of a curved compressible element to the coupler and another extremity of the curved compressible element to the bracket.

The step of linking the coupler and the bracket may be accomplished by connecting one extremity of a triangular-shaped compressible element to the coupler and another extremity of the triangular-shaped compressible element to the bracket.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 4 is a picture showing the inner surface of an elongated skirt panel in accordance with an embodiment of the invention;

FIG. 5 is a picture showing the outer surface of an elongated skirt panel in accordance with an embodiment of the invention;

FIGS. 13A-B are perspective views of the compressive element of FIGS. 12A-B.

DETAILED DESCRIPTION

A novel aerodynamic side skirt assembly will be described hereinafter. Although the invention is described in terms of specific illustrative embodiments, it is to be understood that the embodiments described herein are by way of example only and that the scope of the invention is not intended to be limited thereby.

Figure 1:
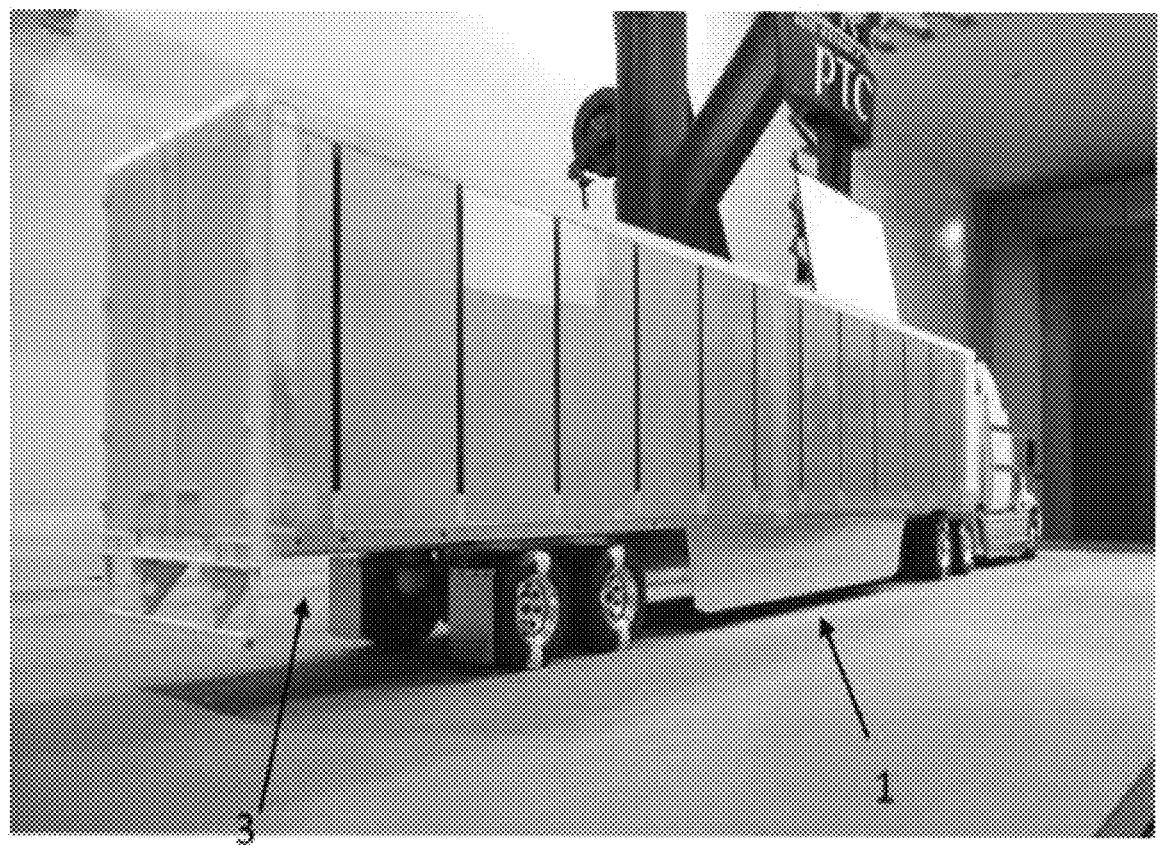
FIG. 1 is a picture showing trailer of truck having an aerodynamic side skirt assembly in accordance with an embodiment of the invention.
Figure 2:
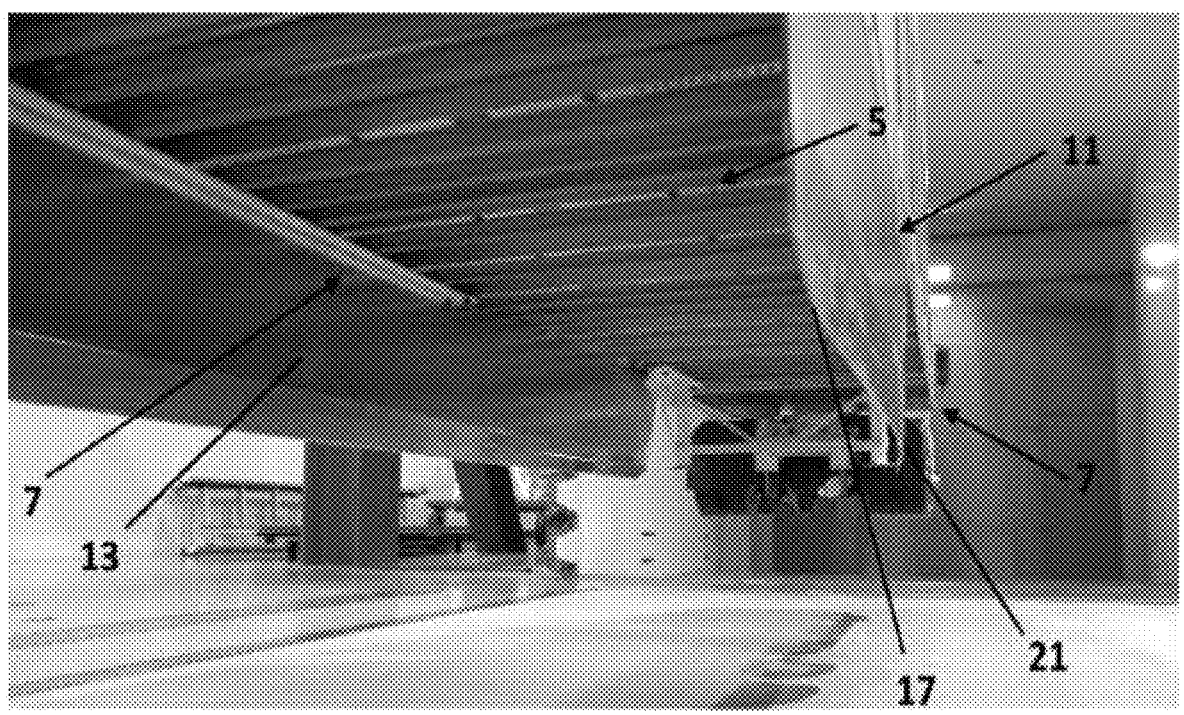
FIG. 2 is a picture showing underneath the trailer having an elongated skirt panel in accordance with an embodiment of the invention.

According to a first embodiment, FIGS. 1-2 illustrate an aerodynamic side skirt assembly (1) for attachment to a trailer or semi trailer (3). The trailer frame comprises lateral rails (5) extending between the longitudinal sides (7) of the trailer (3).

As illustrated on FIGS. 2 and 3, the aerodynamic side skirt assembly, simply named "skirt assembly" herein after, first comprises an elongated skirt panel (11) having an inner surface (13) and an outer surface (15).

Figure 3:
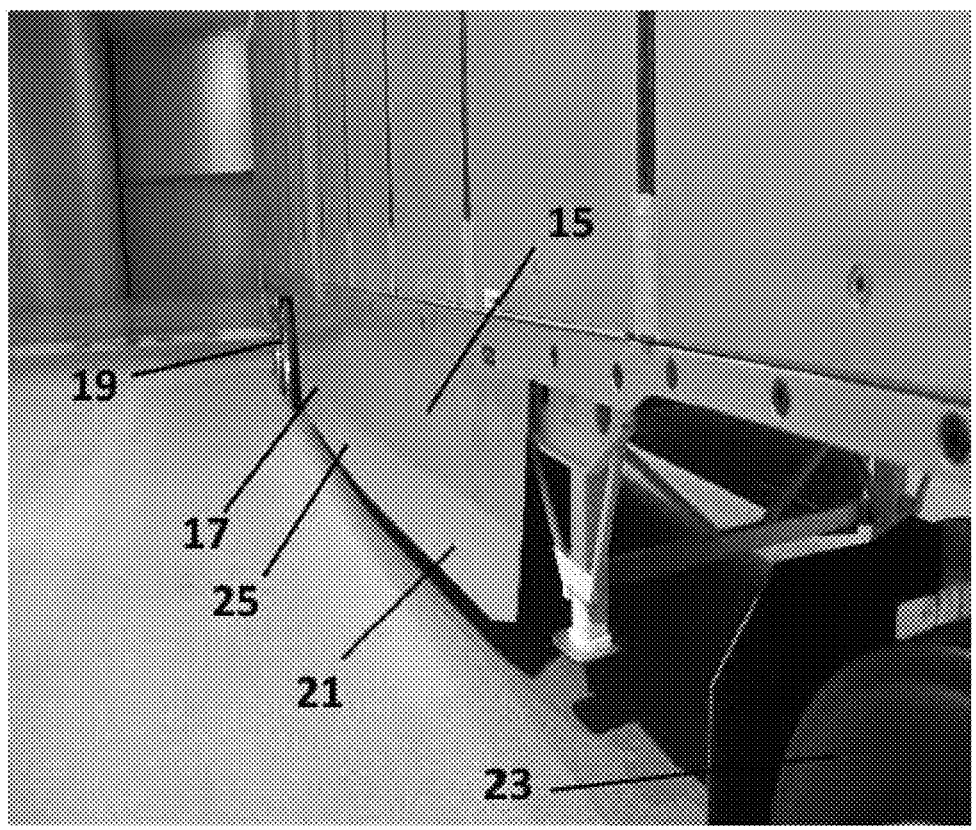
FIG. 3 is a picture showing an edge or side of the trailer having an elongated skirt panel in accordance with an embodiment of the invention.
Figure 6:
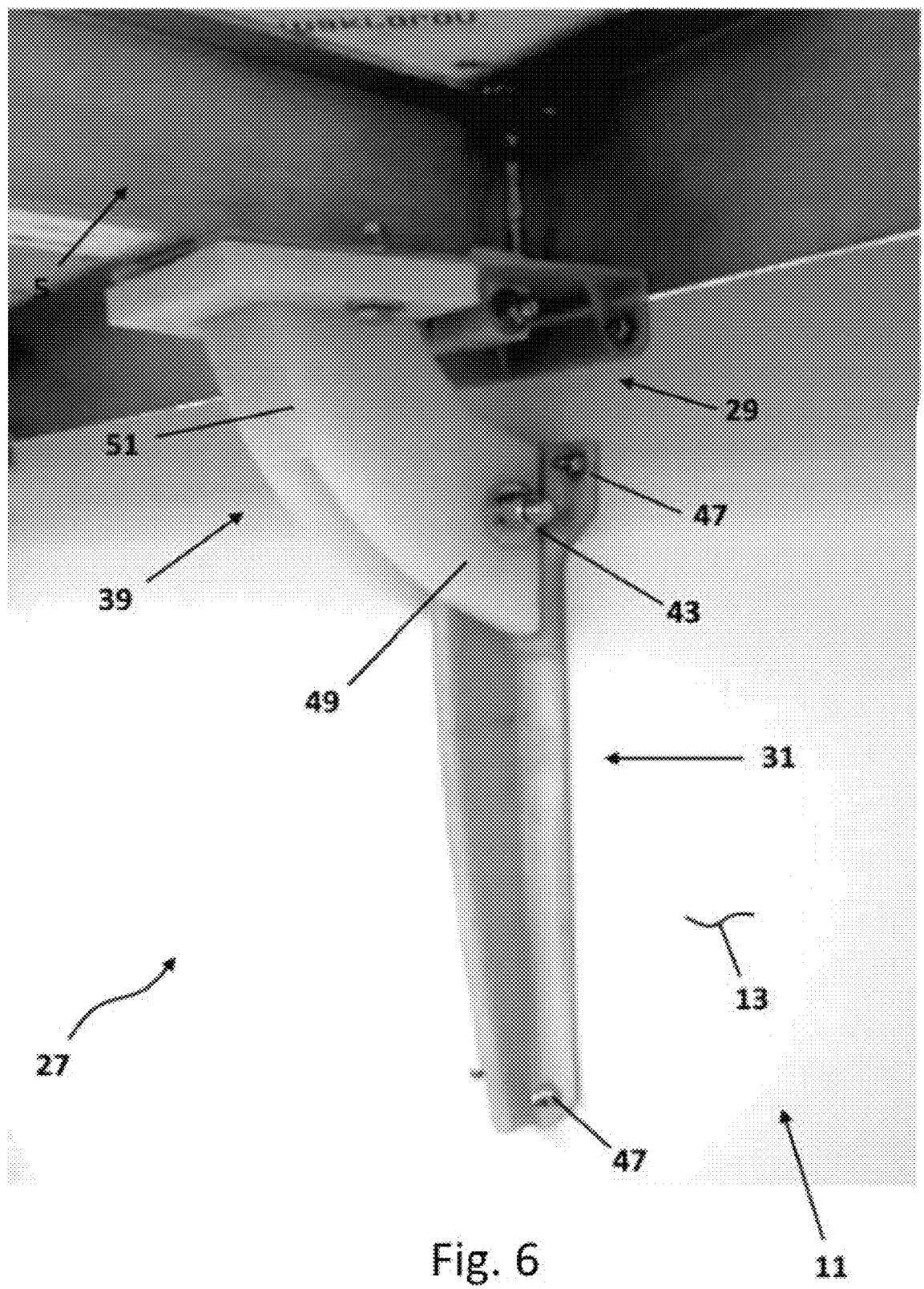
FIG. 6 is a picture showing a skirt attachment system in accordance with an embodiment of the invention.

As visible on FIGS. 2 and 3, the panel is flexible enough to be installed underneath the trailer in an aerodynamic configuration, in which:

a rear straight portion (17) of the panel (11) adjacent to the rear axle (19) of the trailer is aligned with the edges or sides (7) of the trailer, a front straight portion (21) of the panel adjacent to the front axle (23) of the trailer extends inwardly the trailer; and a curved mid-portion (25) of the panel links the rear and front portion.

According to the embodiment visible on FIGS. 4 and 5, the skirt panel (11) is symmetric having a front portion (17) identical to the rear portion (21).

According to such embodiment, the skirt panel is made of a composite thermoplastic and/or thermoset composite material having different fibre orientations (such as: 0-90-90-0-90-0-90-0-90-90-0) to allow to proper puncture resistance. Both inner and outer surfaces of the skirt panel may be coated or co-extruded with a side finish providing UV protection and/or color.

Advantageously, the symmetry of the panels combined with an identical coating (color, anti-UV treatment) on both surfaces allows reversing the panel during installation.

As illustrated on FIGS. 4 and 6 to 8, the aerodynamic side skirt assembly (1) also comprises a plurality skirt attachment systems (27) configured to mount the skirt panel (11) to a corresponding one or more frame rails (5).

Each skirt attachment system first comprises a coupler (29) configured to be coupled to the frame rail (5), and a bracket (31) configured to be coupled to the inner surface (13) of the skirt panel (11).

Figure 7:
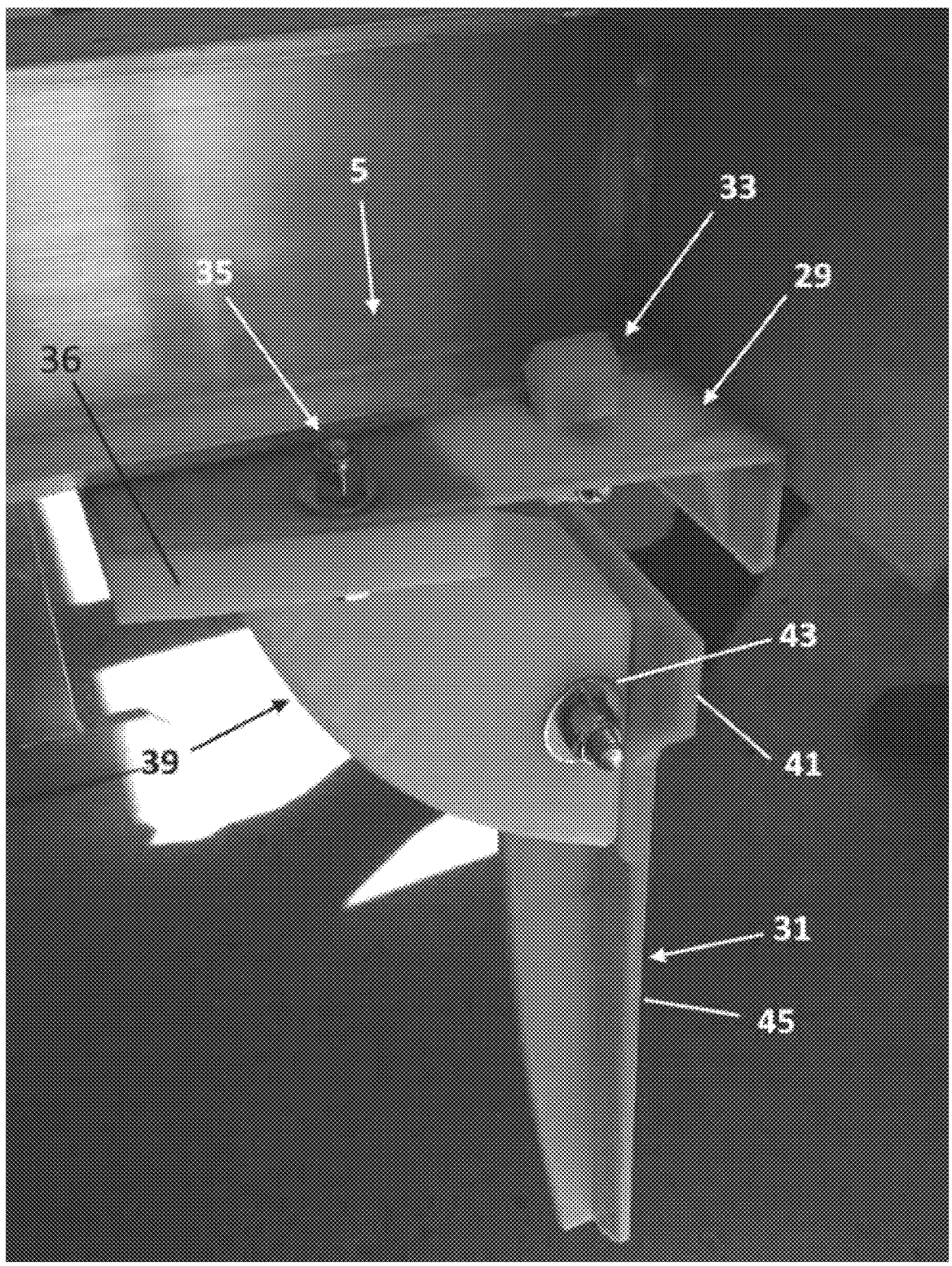
FIG. 7 is a picture showing a top lateral view of the skirt attachment system in accordance with an embodiment of the invention.
Figure 8:
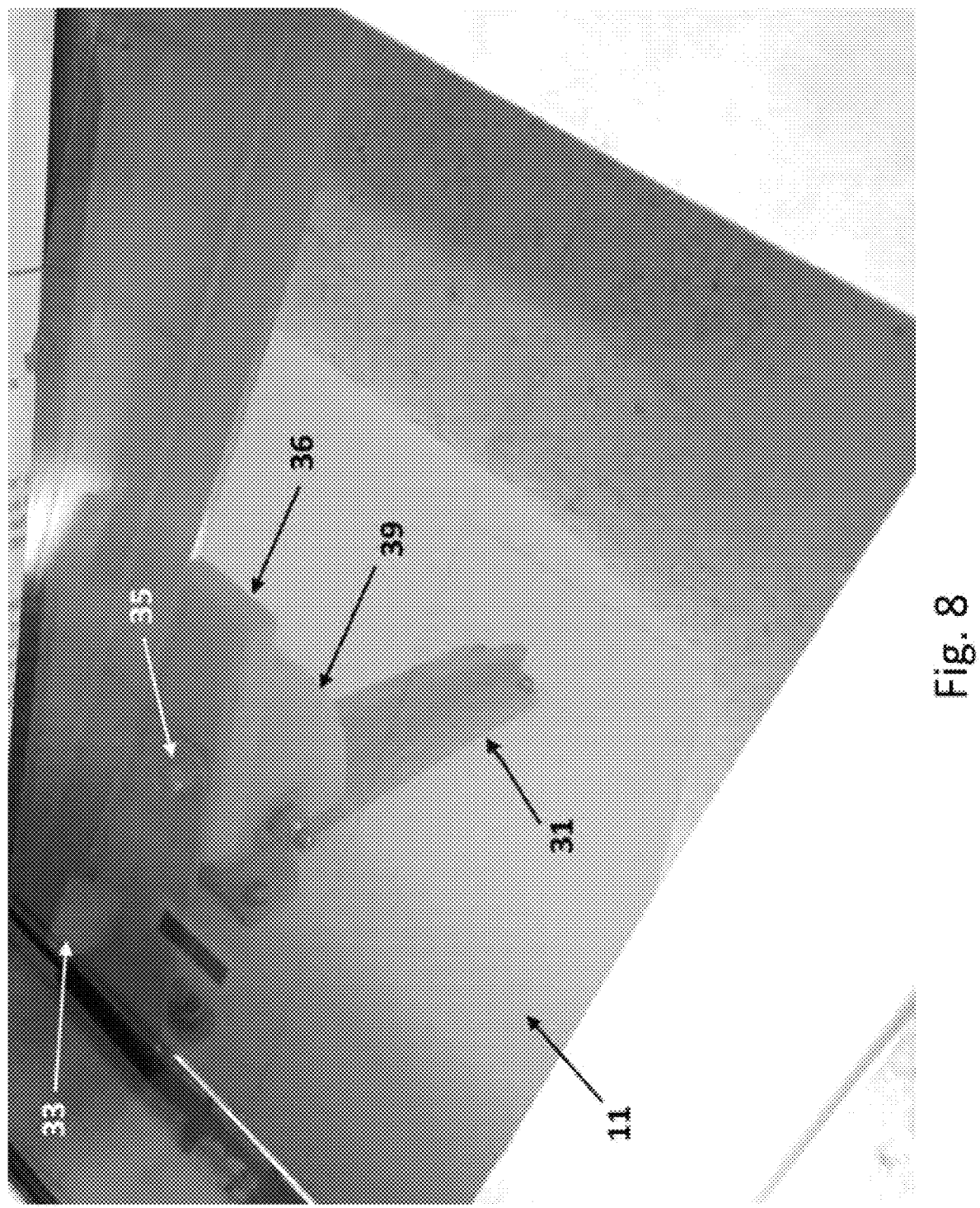
FIG. 8 is a picture showing a top view of the skirt attachment system in accordance with an embodiment of the invention.

As better visible on FIGS. 7 and 8, the coupler (29) is first connected to the corresponding I-beam lateral rail (5) using a pair of clamps (33) providing a lateral force to the rail. The clamps (33) can be made of different materials. The coupler (29) can be also connected to the rail using an attaching element (35) providing a vertical compressive force on the trail. The attaching element (35) can be a bolt and screw as on FIG. 7, or another clamping system that clamps the I-beam on its lateral edges. According to another embodiment, the coupler (29) is connected to the rail with both lateral and vertical compressive forces on the I-beam lateral rail to assure a proper and safe connection to the trailer.

On FIG. 7, a U-shaped element (36) with grooves can be installed between the compressive element (39) and the coupler (29). The U-shaped element is adapted to received lateral winglets (38) visible on FIG. 10. The winglets are adapted to slide into grooves of the U-shaped to be fixed to the cover. Although the U-shaped element (36) is illustrated on FIG. 7 as a separated element, it can be also fused with the coupler (29) to form a single element (for instance by molding). Then, the winglets (38) of the compressive elements (39) will be easily slide into the grove for connecting the compressive element (39) to the coupler (29) once the coupler (29) is fixed to the rail (5) of the trailer. Then, the compressive elements (39) can be secured as aforesaid with either a bolt and screw or clamps to provide vertical compressive forces.

The bottom surface of the coupler (29) facing the compressive element (39) may have grooves to receive the compressing element in a slidable manner (not illustrated).

The bracket (31) may have an upper section (41) connected with a pivot (43) to the compressing element (39). The bracket has a longitudinal surface (45) adapted to be attached to the inner surface of the skirt panel (11) using attaching means (47) such as bolts and screws. Other ways to attach the bracket to the skirt panel can used without departing from the present invention.

The brackets are installed every 36 inches along the panel, or every 3 lateral trails that are generally spaced apart every 12 inches (one foot) along the trailer.

Preferably, the bracket is a rigid bracket made for instance of a reinforced injected hybrid thermoplastic and fiber (glass PP, Glass Nylon, PET, PETG, PC or the like).

Each skirt attachment system further comprises a compressive element (39) configured to connect in a compressible manner the bracket (31) and the coupler (29).

The compressive element (39) may be made at least in part of a compressible material, such as but not limited to a compressive resin molding part made of polyurethane, elastomeric, recycled tire/rubber compound, or the like. In accordance with an embodiment, only a section (49) of the compressive element (39) can be made of a compressive material whereas the rest (51) of the compressive element (39) is made of a rigid non-compressive material. Indeed, it has been discovered that only the portion of the compressive element (39) adjacent to the bracket (31) is generally compressed.

Figure 9:
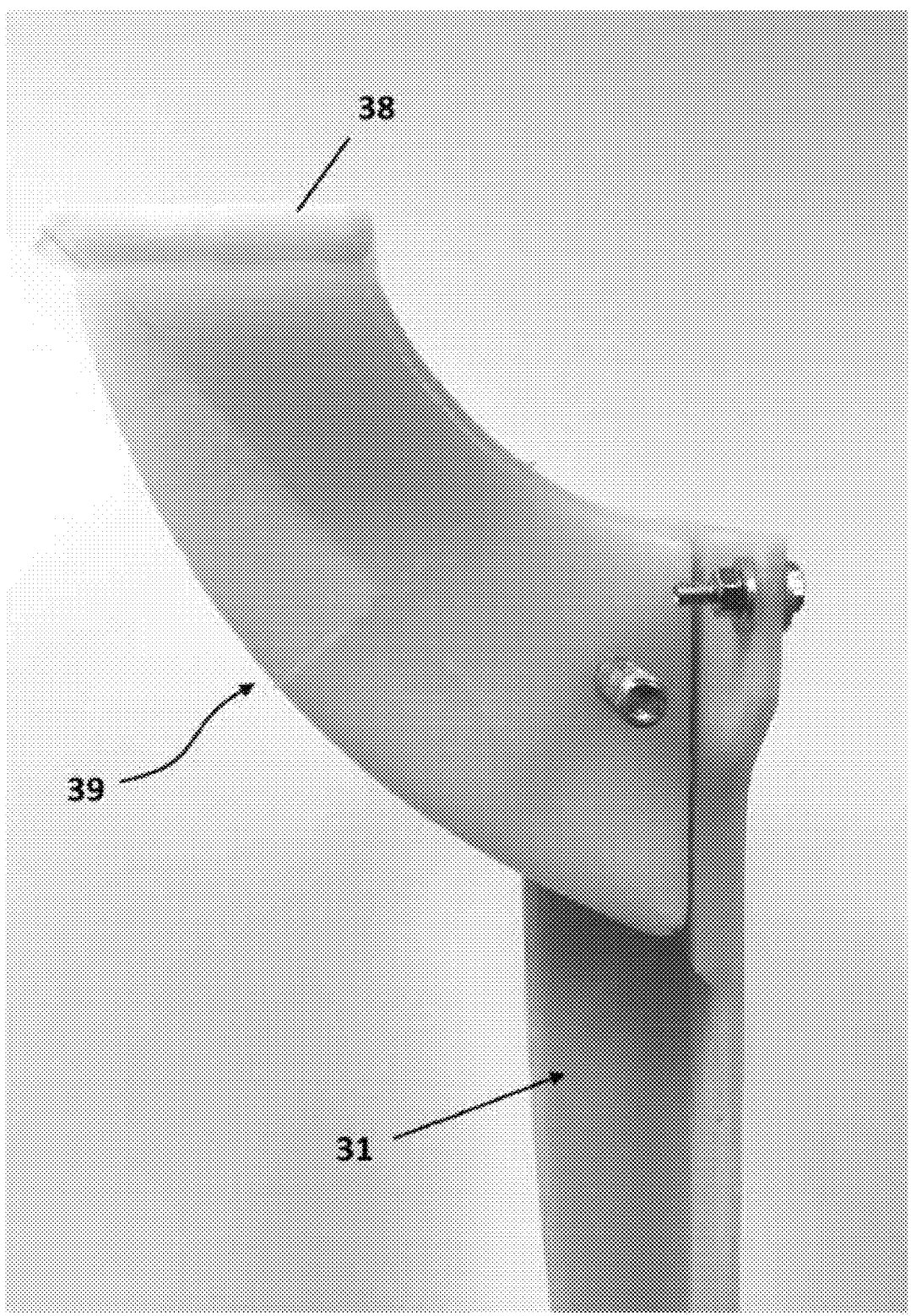
FIG. 9 is a picture showing a lateral view of the compressive element in accordance with an embodiment of the invention.
Figure 10:
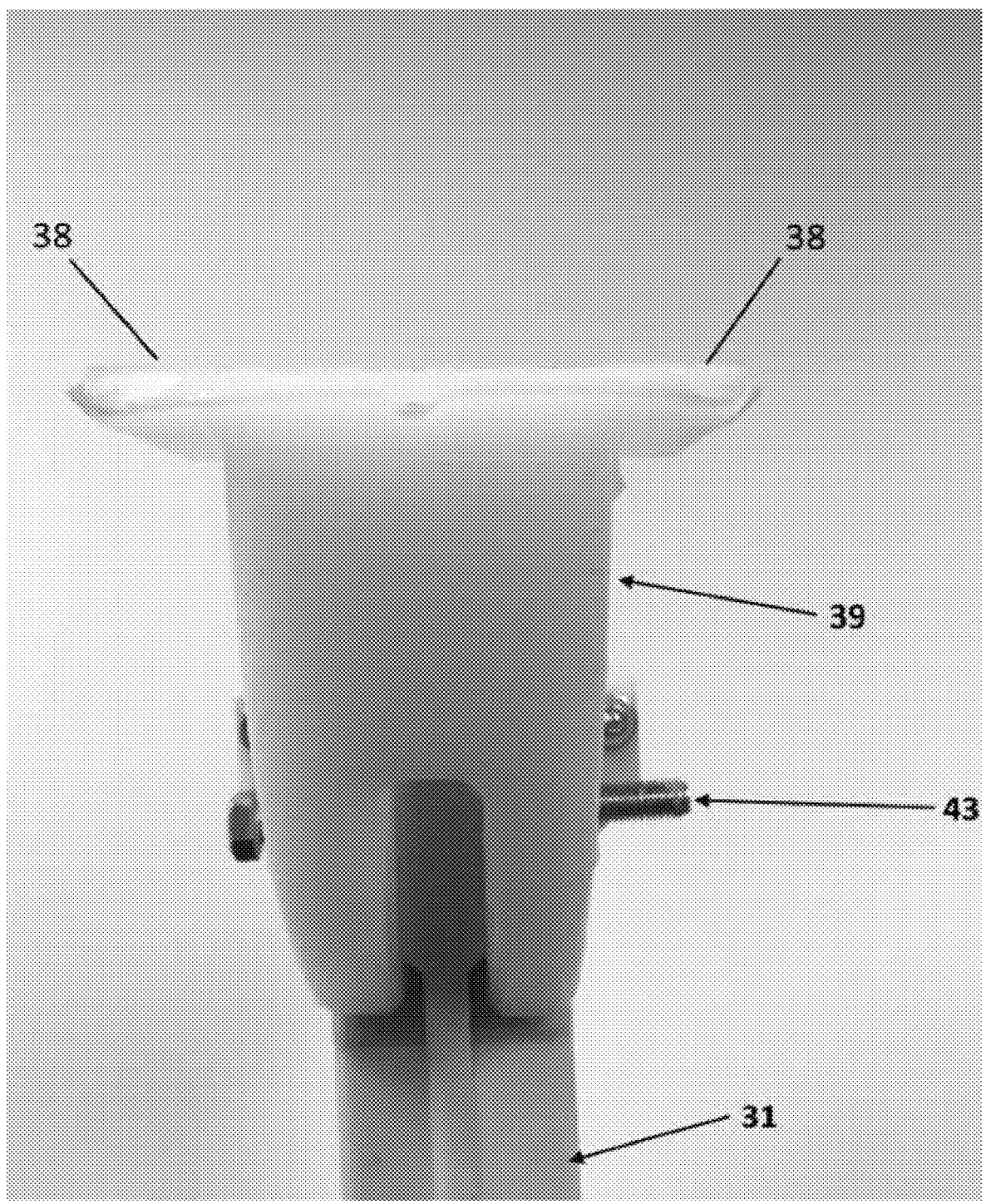
FIG. 10 is a picture showing a front view of the compressive element in accordance with an embodiment of the invention.
Figure 11:
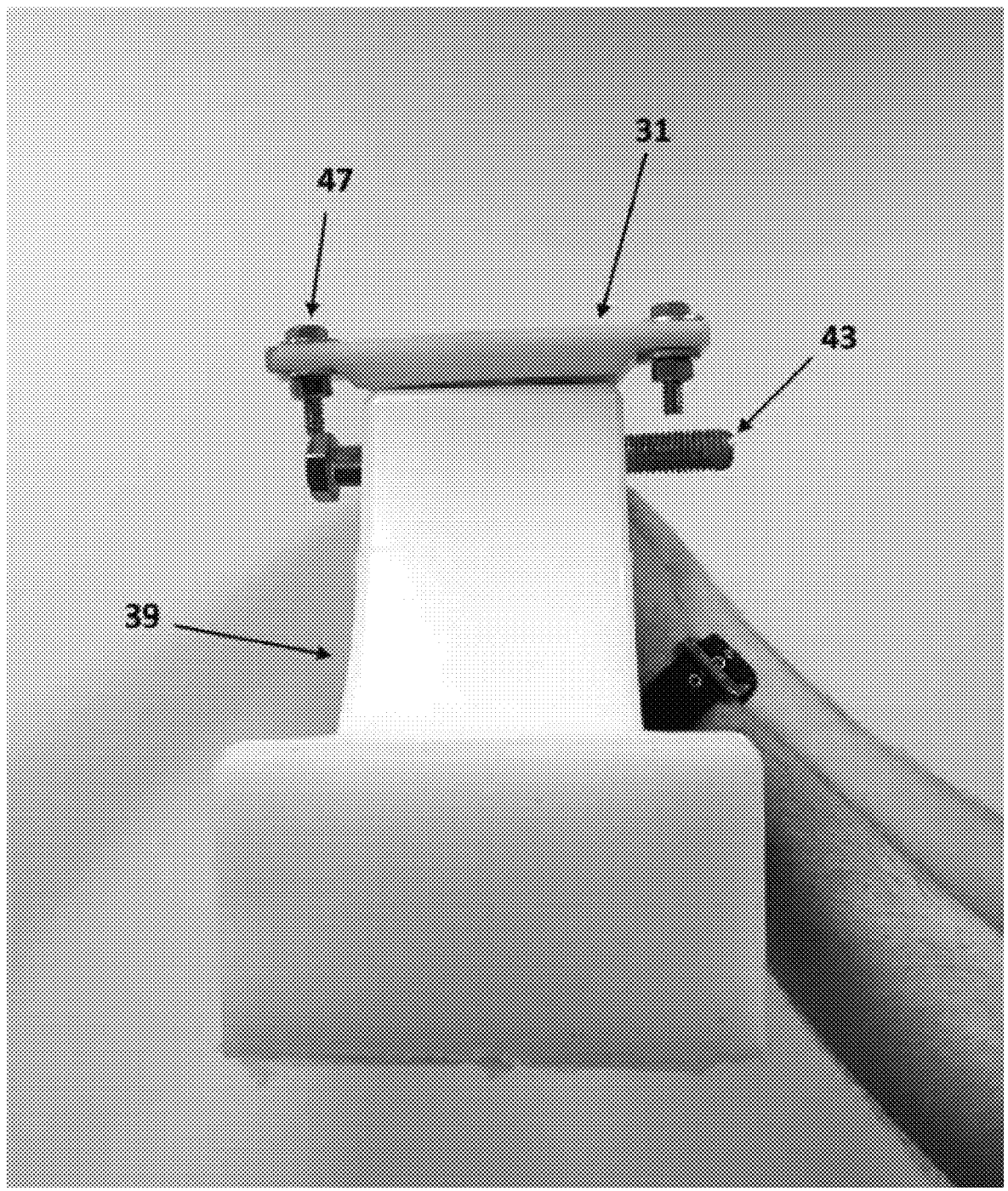
FIG. 11 is a picture showing a top view of the compressive element in accordance with an embodiment of the invention.

As illustrated on FIGS. 9 to 11, the compressive element (39) generally has a semi-circular shape for providing higher compression between the bracket (31) and the coupler (29). It is however possible pursuant to the invention to have a triangular shaped compressive element (39).

The compressive element (39) can be fixed, attached, recessed, or sur-moulded (over moulding with different multi-material) on the fixed bracket (31).

The compressive element (39) allows the skirt panel to move, for instance during the transport of the trailer (3) where the skirt panel (1) receives external forces and impacts.

The present invention provides several advantages, such as:
- a reversible flexible skirt panel, rendering easier the maintenance of the skirt panel, extending the operative life of the aerodynamic skirt;
- the skirt is easily installed underneath the trailer (3) with adaptable aerodynamic configurations due to the flexibility of the skirt panel in function of the size and shape of the trailer,
- easy to install thanks to the two-piece skirt attachment systems;
- a compressive element allowing to absorb vibrations (dampening effect) and to being resistant to external forces or impacts;
- the materials used for the making of the different elements can be recycled material, lowering the price of the skirt assembly while being eco-friendly.

Figure 12A:
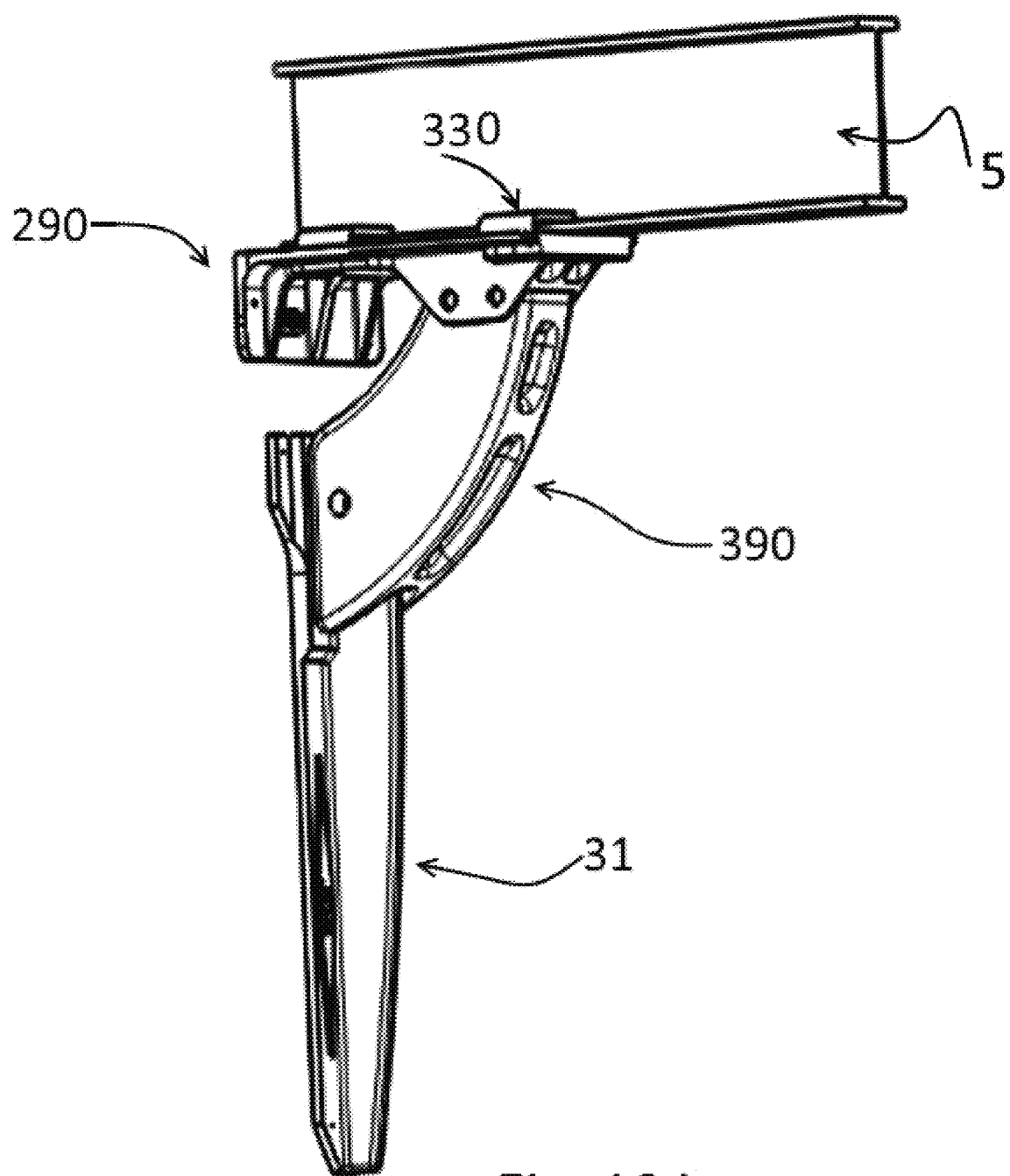
FIGS. 12A-B are perspective views of the side skirt assembly in accordance with another embodiment of the invention.
Figure 12B:
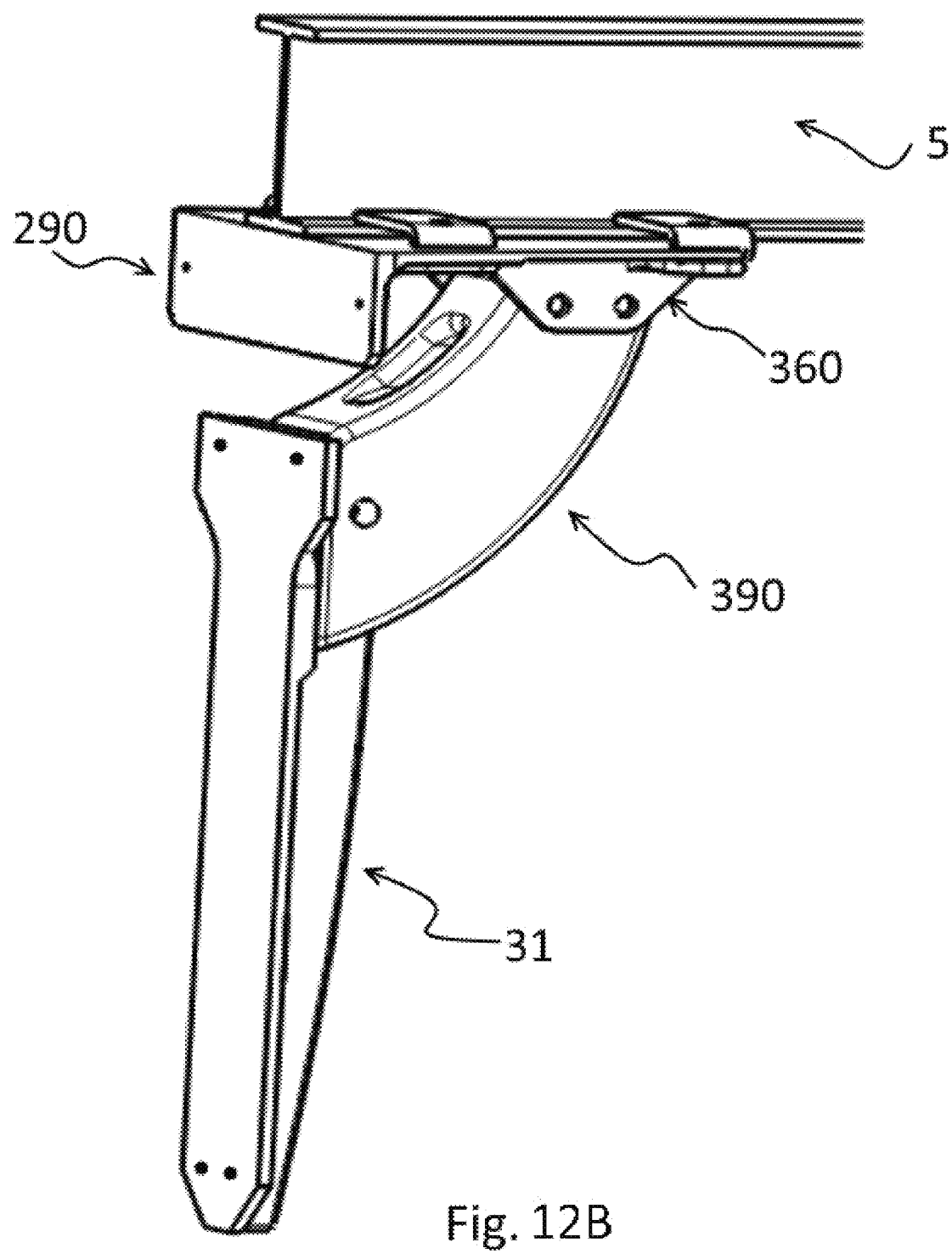

FIGS. 12A-B are perspective views of the side skirt assembly (1) in accordance with another embodiment of the skirt attachment system pursuant to the invention, more specifically another embodiment of the compressible element (390) and of the coupler (290). Contrary to coupler (29), coupler (290) has a pair of downward extending tabs (360), so that U-shaped element (36) is no longer necessary; furthermore, because of different embodiment of clamps (330), lateral winglets (38) are no longer necessary on compressible element (390). FIGS. 13A-B are perspective views of compressible element (390). As shown in such Figures, compressible element (390) has a curved inner radial surface (393), a curved outer radial surface (396), two substantially parallel side surfaces (391), a first extremity section (398) configured to mate with the coupler (290) and a second extremity section (397) configured to mate with the bracket (31). In the embodiment shown in FIGS. 13A-B, first extremity section (398) comprises holes similarly dimensioned and positioned to holes in the pair of downward extending tabs (360) from the coupler (290), so as to enable the proper attachment (with the addition of a bolt and screw combination) between first extremity section (398) and coupler (290); it is however understood that other ways of connecting compressible element (390) to coupler (290) is possible pursuant to the invention. Second extremity section (397) is shaped so as to be able to mate with a flange portion of the T-shaped bracket (31) and comprises holes similarly dimensioned and positioned to holes in flange portion of the T-shaped bracket (31), so as to enable the proper attachment (with the addition of a bolt and screw combination) between second extremity section (397) and bracket (31); it is however understood that other ways of connecting compressible element (390) to bracket (31) is possible pursuant to the invention.

In the embodiment shown in FIGS. 13A-B, compressive element (390) have apertures (392, 394, 395) in the inner/outer radial surfaces (393/396) so as to assist in the compressive nature of compressive element 390.

While illustrative and presented embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. An apparatus for attaching an aerodynamic side skirt panel to a truck trailer, the apparatus comprising:
   a coupler attached to a lateral rail of the truck trailer and attached to an upper portion of the skirt panel;
   a bracket attached to upper and lower portions of the skirt panel; and
   a compressible element comprising two extremities, the first extremity of the compressible element being fixed to the coupler and the second extremity of the compressible element being fixed to the bracket.

2. The apparatus of claim 1, wherein the bracket is longitudinally T-shaped, having a flange and a web portion, the flange portion of the bracket being configured to be coupled to an inner surface of the skirt panel and the web portion of the bracket being configured to mate with a distal extremity of the compressible element.

3. The apparatus of claim 1, wherein the coupler is L-shaped, having a longer and a shorter portion, the longer portion of the coupler being configured to be coupled to the lateral rail of the truck trailer and the shorter portion of the coupler being configured to be coupled to an inner surface of the skirt panel.

4. The apparatus of claim 3, wherein the lateral rail of the truck trailer is longitudinally I-shaped, having 2 flange portions and a web portion, and the coupler further comprises at least one pair of clamps configured to attach the longer portion of the coupler to one of the flange portions of the lateral rail.

5. The apparatus of claim 4, wherein the coupler further comprises a pair of tabs extending from the longer portion of the coupler and being configured to be attached to an outer surface of the compressible element.

6. The apparatus of claim 1, wherein the compressible element has a curved inner radial surface, a curved outer radial surface, two substantially parallel side surfaces, a first extremity surface configured to attach to the coupler and a second extremity surface configured to mate with the bracket.

7. An aerodynamic side skirt assembly for attachment to a trailer comprising lateral rails extending between the longitudinal sides of the trailer, the side skirt assembly comprising:
    an elongated skirt panel having an inner surface and an outer surface; and
    at least one skirt attachment system configured to mount the skirt panel to a corresponding one or more frame rails, each skirt attachment system comprising:
        a coupler attaching an upper portion of the skirt panel to the frame rail;
        a bracket attached to the inner surface of the skirt at upper and lower portions thereof and
        a compressive element comprising two extremities, the first extremity of the compressible element being fixed to the coupler and the second extremity of the compressible element being fixed to the bracket, the compressive element being made at least in part of an elastomeric material.

8. The aerodynamic side skirt assembly of claim 7, wherein the bracket is longitudinally T-shaped, the bracket comprising a flange and a web portion, the flange portion of the bracket being configured to be coupled to the inner surface of the skirt panel and the web portion of the bracket being configured to mate with a distal extremity of the compressible element.

9. The aerodynamic side skirt assembly of claim 7, wherein the coupler is L-shaped, having a longer and a shorter portion, the longer portion of the coupler being configured to the lateral rail of the trailer and the shorter portion of the coupler being configured to be coupled to the inner surface of the skirt panel.

10. The aerodynamic side skirt assembly of claim 9, wherein the lateral rail of the truck trailer is longitudinally I-shaped, having 2 flange portions and a web portion, and the coupler further comprises at least one pair of clamps configured to attach the longer portion of the coupler to one of the flange portions of the lateral rail.

11. The aerodynamic side skirt assembly of claim 10, wherein the coupler further comprises a pair of tabs extending from the longer portion of the coupler and being configured to be attached to an outer surface of the compressible element.

12. The aerodynamic side skirt assembly of claim 7, wherein the compressible element has a curved inner radial surface, a curved outer radial surface, two substantially parallel side surfaces, a first extremity surface configured to attach to the coupler and a second extremity surface configured to mate with the bracket.

13. The aerodynamic side skirt assembly of claim 12, wherein the first extremity surface comprises at least one hole dimensioned and positioned to be alignable with at least one hole in a pair of tabs extending from the coupler.

14. The aerodynamic side skirt assembly of claim 12, wherein the second extremity surface comprises at least one hole dimensioned and positioned to be alignable with at least one hole in the bracket.

15. The aerodynamic side skirt assembly of claim 12, wherein one of the first and second extremity surface comprises at least one aperture.

16. The aerodynamic side skirt assembly of claim 12, wherein the second extremity surface comprises a U-shaped aperture dimensioned and positioned to mate with a web portion of the bracket.

17. The aerodynamic side skirt assembly of claim 7, wherein the skirt panel has a substantially similar leading edge and trailing edge side profiles.

18. A method of attaching an aerodynamic side skirt panel to a trailer comprising at least one lateral rail extending between the longitudinal sides of the trailer, the method comprising:
    attaching a coupler to the at least one lateral rail of the truck trailer;
    attaching an upper portion of the skirt panel to the coupler;
    attaching a bracket to upper and lower portions of the skirt panel; and
    fixing a first extremity of a compressible element to the couplers; and
    fixing a second extremity of the compressible element to the bracket.

19. The method of claim 18, wherein the compressible element is curved and is compressible along its length.

20. The apparatus of claim 1, the compressible element being longitudinally compressible between the first and the second extremities.

21. The apparatus of claim 1, the coupler being attached at one end to the top-most portion of the side skirt panel.

* * * * *